UNITED STATES PATENT OFFICE.

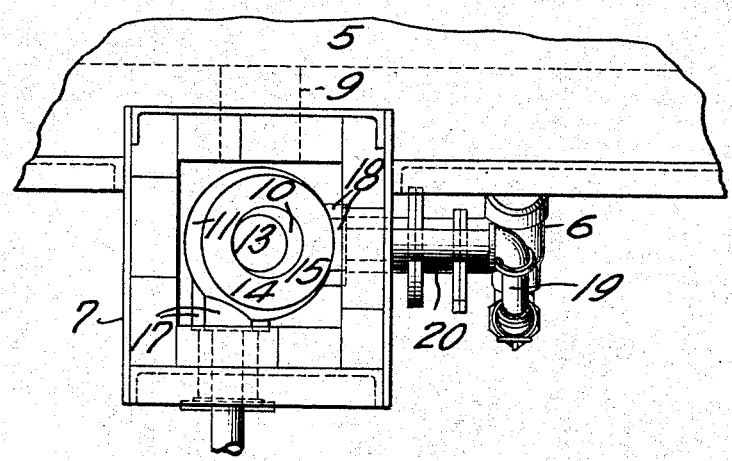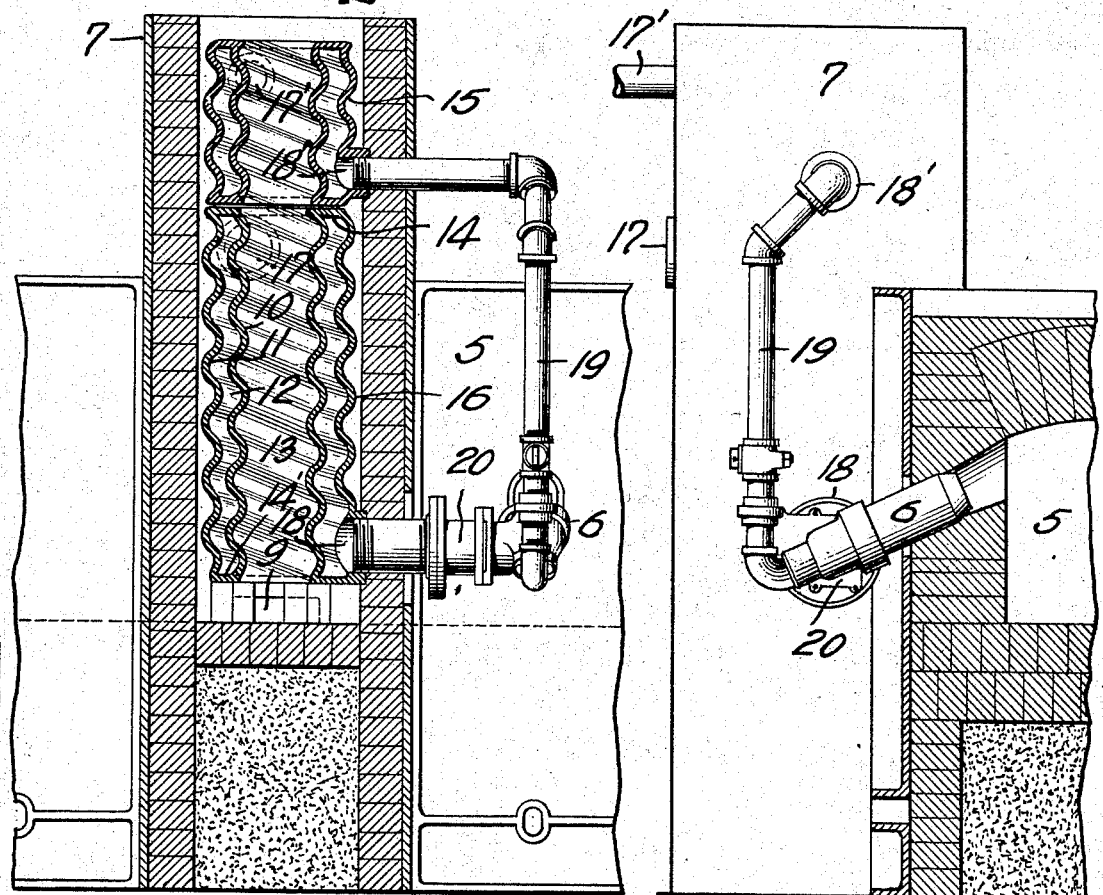

FRANCIS A. JACOBS, OF MONTREAL, QUEBEC, CANADA.

PREHEATER FOR FLUID-FUEL FURNACES.

1,128,146.  Specification of Letters Patent.  Patented Feb. 9, 1915.

Application filed May 4, 1914. Serial No. 836,363.

*To all whom it may concern:*

Be it known that I, FRANCIS A. JACOBS, a citizen of the Dominion of Canada, and resident of the city of Montreal, in the Province of Quebec and Dominion of Canada, have invented certain new and useful Improvements in Preheaters for Fluid-Fuel Furnaces, and do hereby declare that the following is a full, clear, and exact description of same.

This invention relates to improvements in preheating apparatus for use in connection with oil or gas furnaces and the like, and the object is to provide means for preheating both the air and gas delivered to the burners using as the heating agent waste heat from the furnace.

A further object is to provide a preheater of simple and durable construction, compact in design, and having a large amount of heating surface so disposed as to prolong the passage of the fluids over the heating surface.

The device consists essentially of an annular chamber for each fluid to be heated, said chamber being substantially helical in form. These chambers surround a stack through which gases escape from the furnace. The chambers are separate and are individually connected to the burner.

In the drawings which illustrate the invention:—Figure 1 is a plan view of the device. Fig. 2 is a side elevation. Fig. 3 is a vertical sectional view through the center of the preheating apparatus.

Referring more particularly to the drawings; 5 designates a furnace heated by one or more gas or oil burners 6, and having a stack 7 for the escape of waste gases communicating at its lower end with the furnace through a passage 9.

The preheating apparatus is arranged in the stack, and consists of a separate heater for each fluid to be dealt with, for the reason that in many instances these fluids are heated to the point of incandescence, so that if mingled, combustion would be set up spontaneously.

In the drawing, an apparatus is shown adapted for heating air and oil or other gas, but it is obvious that in other types of furnace where additional gases are used, additional heaters may be provided as required. Each heater consists of a tube having inner and outer helical corrugated walls 10 and 11 respectively, spaced apart so as to form an annular chamber 12 of such form that fluid flowing therethrough will traverse a substantially helical path. Within the inner wall 10 is a passage 13 for the heating agent. The chambers 12 are completely closed at the ends by walls 14, 14' so that the heating agent cannot enter the annular chamber and mingle with the fluid therein. In designing such preheating apparatus, the size of the heating chambers will be regulated according to the volume of fluid to be handled, thus in Fig. 3, a comparatively small heater 15 is shown for gas and a large heater 16 for air. In this form, the air heater is placed in the hottest part, in order to heat a large volume of air in a heater of minimum size. The air chamber is provided at the top with an inlet 17 and at the bottom with an outlet 18 and the oil chamber is provided with a similar inlet 17' and outlet 18', so that the fluid to be heated passes through the heaters in the opposite direction, to the heating agent. In the installation illustrated, the gas heater 15 is connected to the burner by a pipe 19, and the air heater by a pipe 20, entirely separated from each other, so that the two fluids do not mingle before reaching the combustion point in the burner.

From the foregoing description, it will be seen that means are provided to utilize the waste heat of a furnace for preheating the fuel, so that a greater efficiency is obtained in the furnace. The preheater is simple and durable in design, inexpensive to maintain, and efficient in operation, as it reclaims waste heat. The use of helical corrugated walls not only increases the heating surface, but compels the fluid heated to remain longer in contact with the heating surfaces. Another great advantage resides in the use of these corrugated walls, which is that expansion and contraction of the heaters are taken up in the walls themselves, so that there is practically no change in the overall length, and pipe connections are not unduly stressed.

Having thus described my invention, what I claim is:—

1. The combination with a stack of an oil burning furnace of a plurality of independent heating units within the stack for separately heating oil and air to a uniform temperature, each unit formed of a double walled tubular body having spaces between the walls thereof closed at the ends to form an annular chamber surrounding the bore of the body, an inlet and an outlet for each said chamber, a burner and conduits communicating with said burner and heating units for conducting the heated oil and air separately to said burner.

2. A device of the character described, comprising the combination with a stack or other passage for the escape of waste heat, of a plurality of tubular members arranged axially in line within said passage, each of said members having inner and outer helical corrugated walls connected together at the ends to form helical passages surrounding the central bore of the tubular members, and inlet and outlet passages for the individual tubular members arranged to compel flow of the fluid to be heated in a direction opposite to the flow of the heating agent through the bore of said tubular members.

In witness whereof, I have hereunto set my hand in the presence of two witnesses.

FRANCIS A. JACOBS.

Witnesses:
S. R. W. ALLEN,
G. M. MORELAND.